(12) United States Patent
Moon

(10) Patent No.: US 8,426,854 B2
(45) Date of Patent: Apr. 23, 2013

(54) DISPLAY DEVICE

(75) Inventor: Chang-Yun Moon, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 13/306,812

(22) Filed: Nov. 29, 2011

(65) Prior Publication Data

US 2013/0049019 A1 Feb. 28, 2013

(30) Foreign Application Priority Data

Aug. 29, 2011 (KR) .......................... 10-2011-0086540

(51) Int. Cl.
*H01L 31/167* (2006.01)
(52) U.S. Cl.
USPC ............... 257/43; 257/40; 257/84; 257/432; 257/E31.026; 136/252; 136/255; 136/256; 136/259

(58) Field of Classification Search .............. 257/40–43, 257/84, 432; 438/57, 71–73; 136/252, 256, 136/259
See application file for complete search history.

(56) References Cited

U.S. PATENT DOCUMENTS

2011/0214723 A1\* 9/2011 Kang et al. .................... 136/255

FOREIGN PATENT DOCUMENTS

| KR | 10-2005-0083243 A | 8/2005 |
| KR | 10-2008-0065120 A | 7/2008 |
| KR | 10-2011-0014326 A | 2/2011 |

\* cited by examiner

*Primary Examiner* — Dung A. Le
(74) *Attorney, Agent, or Firm* — Christie, Parker & Hale, LLP

(57) ABSTRACT

Exemplary embodiments of the described technology relate generally to display devices including dye-sensitized solar cells. The display device according to an exemplary embodiment includes a display element for displaying an image, and a dye-sensitized solar cell for converting light into electricity to offset the power consumption of the display element. The dye-sensitized solar cell includes a selective photo-absorption material for selectively absorbing light from at least one wavelength band.

14 Claims, 4 Drawing Sheets

DISPLAY DEVICE

CROSS-REFERENCE TO RELATED APPLICATION

This application claims priority to and the benefit of Korean Patent Application No. 10-2011-0086540 filed in the Korean Intellectual Property Office on Aug. 29, 2011, the entire content of which is incorporated herein by reference.

BACKGROUND

1. Technical Field

Exemplary embodiments of the described technology relate generally to display devices. More particularly, the described technology relates generally to display devices including dye-sensitized solar cells.

2. Description of Related Art

Recently, flat panel display devices having light weight and easy portability have been spotlighted. Of the flat panel display devices, there are organic light emitting diode displays, liquid crystal displays, and electrophoretic displays (EPD).

The portable display devices generally use batteries as the power supply. However, because the usage time of the battery is limited in portable display devices, conserving the power supply has emerged as a very important and challenging problem.

Conventionally, to increase the usage time of the battery used in portable display devices, research has concentrated on various algorithms and power saving circuits to save power. However, electrical energy that is accumulated in the battery is not an unlimited source, and therefore the saving of power is limited.

Accordingly, a method of assisting power consumption of the display device by attaching a solar cell to the display device has been developed.

However, the solar cell attached to the display device absorbs generated light to display an image in the display device, and absorbs external light (such as sunlight) in order to increase the power consumption of the display device. This may result in the visibility or image quality of the display device being deteriorated.

The above information disclosed in this Background section is presented solely to enhance the understanding of the background of the described technology, and therefore may contain information that does not form the prior art that is already known in this country to a person of ordinary skill in the art.

SUMMARY

In an exemplary embodiment, a display device has improved power efficiency while using a dye-sensitized solar cell.

According to an exemplary embodiment, a display device includes a display element for displaying an image, and a dye-sensitized solar cell for converting light into electricity to offset the power consumption of the display element. The dye-sensitized solar cell includes a selective photo-absorption material for selectively absorbing light for each wavelength band.

The display element may be an organic light emitting element.

Among the wavelength bands in the visible ray region and the near infrared ray region, the dye-sensitized solar cell may absorb relatively more light corresponding to wavelength bands other than the wavelength band of the light generated in the display element.

The dye-sensitized solar cell may be disposed in a front direction and/or a rear direction of the display element.

The dye-sensitized solar cell may include: a transparent conductive layer; a nanoparticle oxide electrode disposed near and contacting the transparent conductive layer; a photo-sensitized dye adhered to the nanoparticle oxide electrode; an opposite electrode arranged opposite to the transparent conductive layer such that the nanoparticle oxide electrode is disposed therebetween; and an electrolyte solution filled between the transparent conductive layer and the opposite electrode, wherein the photo-sensitized dye may include the selective photo-absorption material.

A platinum metal catalyst electrode may be used as the opposite electrode.

The nanoparticle oxide electrode may be made of titanium oxide ($TiO_2$).

The photo-sensitized dye may include cadmium sulfide (CdS).

The dye-sensitized solar cell may further include a battery sealing member for sealing a space between the transparent conductive layer and the opposite electrode.

At least one of the transparent conductive layer and the opposite electrode may be supported by a base film.

The selective photo-absorption material may include at least one compound represented by Chemical Formula 1 through Chemical Formula 12.

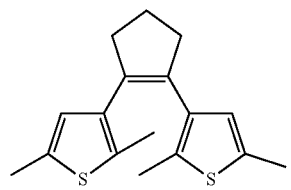

Chemical Formula 1

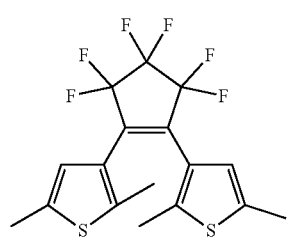

Chemical Formula 2

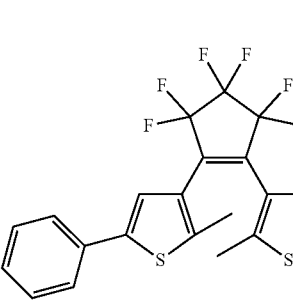

Chemical Formula 3

Chemical Formula 4

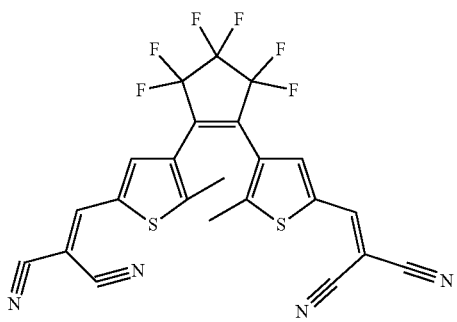

Chemical Formula 5

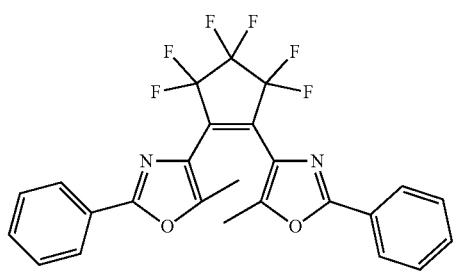

Chemical Formula 6

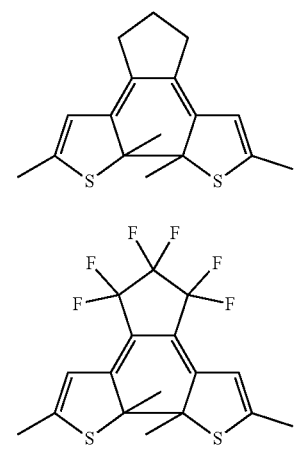

Chemical Formula 7

Chemical Formula 8

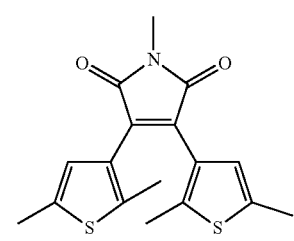

Chemical Formula 9

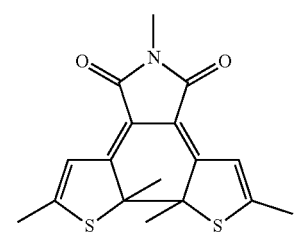

Chemical Formula 10

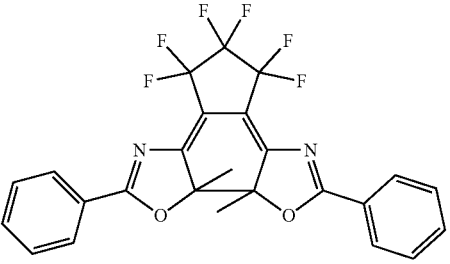

Chemical Formula 11

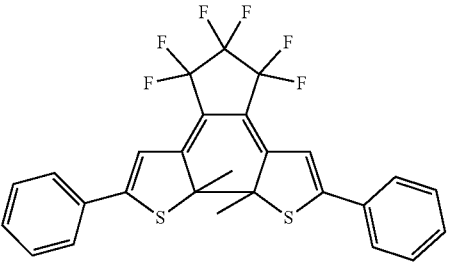

Chemical Formula 12

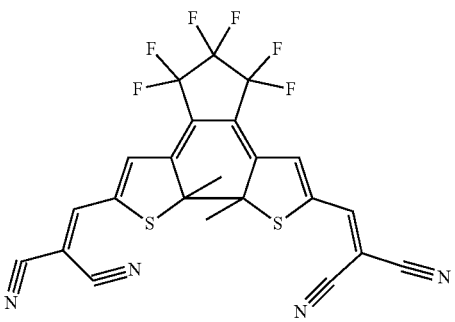

The dye-sensitized solar cell may absorb relatively more light in the wavelength bands of 320 nm to 380 nm, 440 nm to 540 nm, and 630 nm to 900 nm than light of the other wavelength bands.

The selective photo-absorption material including at least one of the compounds represented by Chemical Formula 1 to Chemical Formula 5 may absorb relatively more light of the wavelength band of 320 nm to 380 nm than light of the other wavelength bands.

The selective photo-absorption material including at least one of the compounds represented by Chemical Formula 6 to Chemical Formula 10 may absorb relatively more light of the wavelength band of 440 nm to 540 nm than light of the other wavelength bands.

The selective photo-absorption material including at least one of the compounds represented by Chemical Formula 11 and Chemical Formula 12 may absorb relatively more light of the wavelength band of 630 nm to 900 nm than light of the other wavelength bands.

According to an exemplary embodiment, the display device may improve power usage efficiency through the selective absorption of light by the dye-sensitized solar cell.

DETAILED DESCRIPTION

Figure 1:
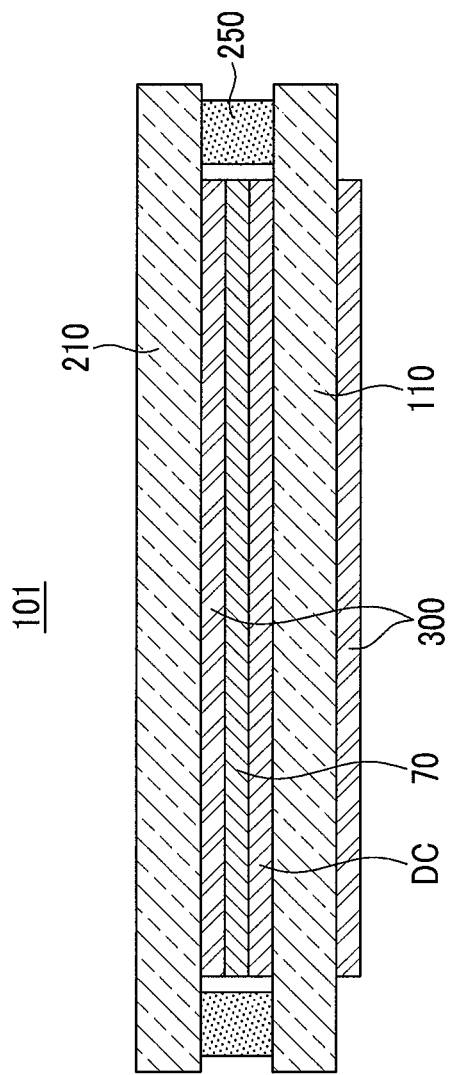
FIG. 1 is a cross-sectional view of a display device according to an exemplary embodiment.

The present invention will be described more fully hereinafter with reference to the accompanying drawings in which exemplary embodiments of the invention are shown. As those skilled in the art would realize, the described embodiments may be modified in various different ways, all without departing from the spirit or scope of the present invention.

The drawings are schematic and are not drawn to scale. Relative scales and ratios in the drawings are enlarged or reduced for the purpose of accuracy and convenience, and the scales are random and the disclosure is not limited thereto. In addition, like reference numerals designate like structures, elements, or parts throughout the specification. It will be understood that when an element is referred to as being "on" another element, it can be directly on another element or intervening elements may be present therebetween.

Views of exemplary embodiments represent ideal exemplary embodiments in detail. Therefore, various modifications of the diagrams are expected. Accordingly, the present disclosure is not limited to the exemplary embodiments or to the specific shapes of depicted regions, and for example, the disclosure also includes modifications of the shapes by manufacturing.

Figure 2:
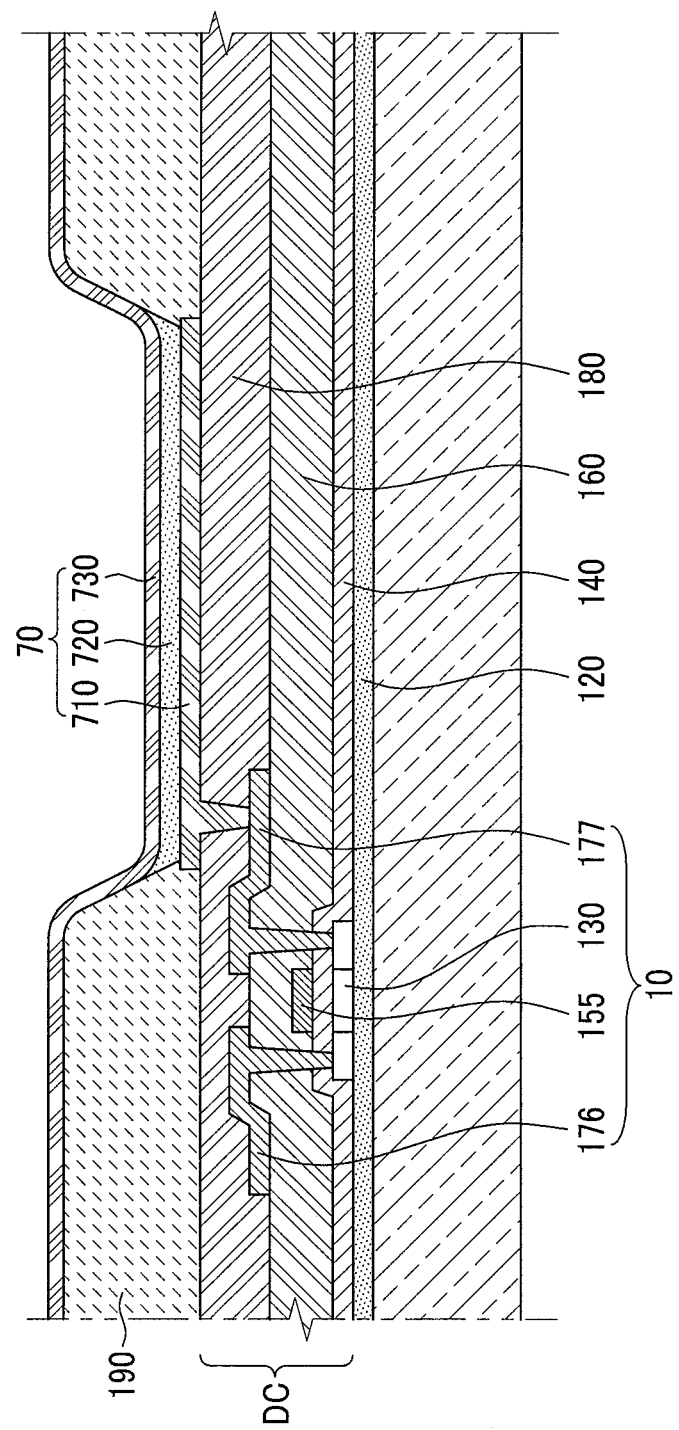
FIG. 2 is an enlarged cross-sectional view of the display element of FIG. 1.
Figure 3:
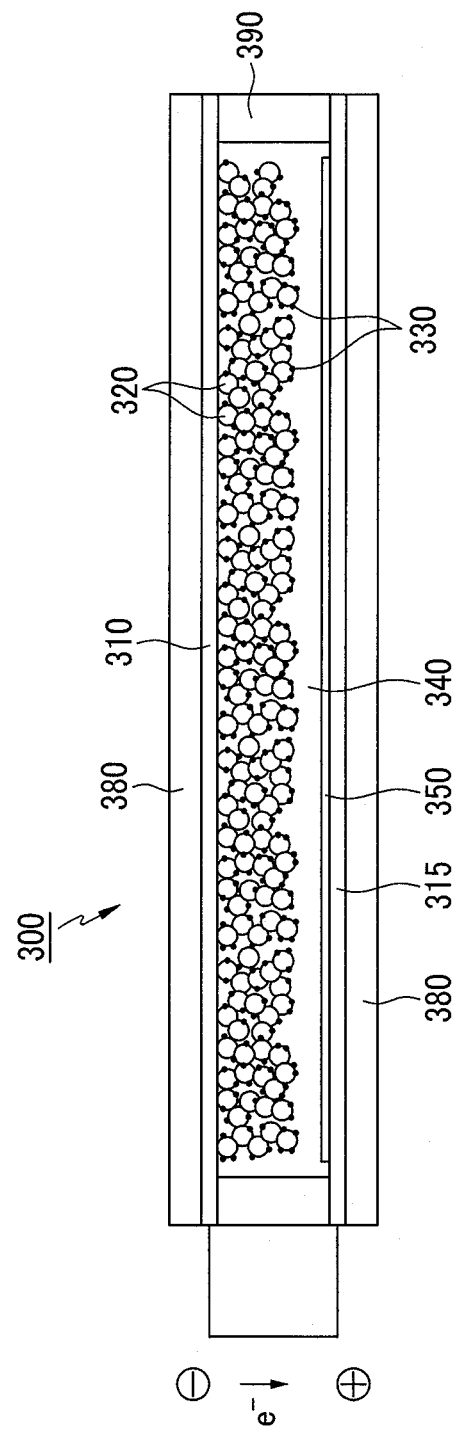
FIG. 3 is a cross-sectional view of the dye-sensitized solar cell of FIG. 1.

Referring to FIG. 1 through FIG. 3, a display device 101 according to an exemplary embodiment will be described. As shown in FIG. 1, the display device 101 according to an exemplary embodiment includes a display element 70 for displaying an image, and a dye-sensitized solar cell 300. Here, the display element 70 is an organic light emitting element. Also, the display element 70 may emit light in at least one of the front and rear directions. Accordingly, the display device 101 according to an exemplary embodiment may display the image on one surface or both surfaces and may be formed on a transparent display.

In detail, the display device 101 includes a substrate main body 110, a driving circuit unit (DC) formed on the substrate main body 110, a display element 70 connected to the driving circuit unit (DC), a sealing member 210 arranged opposite to the substrate main body 110 such that the display element 70 is disposed therebetween, a sealant 250 disposed at the edge of the substrate main body 110 and the sealing member 210 to seal the space between the substrate main body 110 and the sealing member 210, and a dye-sensitized solar cell 300 disposed between the display element 70 and the sealing member 210. Also, in an exemplary embodiment, the dye-sensitized solar cell 300 may be additionally disposed on the rear surface of the substrate main body 110. Also, the dye-sensitized solar cell 300 may only be disposed on the rear surface of the substrate main body 110. That is, the dye-sensitized solar cell 300 may be disposed at the front or the rear of the display element 70, or at both the front and the rear of the display element 70.

The dye-sensitized solar cell 300 generates electricity by capturing irradiated external light (such as sunlight) to offset the power consumption of the display element 70.

Also, the dye-sensitized solar cell 300 according to an exemplary embodiment selectively absorbs light for each wavelength band. In detail, among wavelength bands in the visible ray region and the near infrared ray region, the dye-sensitized solar cell 300 absorbs relatively more light of wavelength bands other than those generated in the display element 70. That is, the dye-sensitized solar cell 300 absorbs a relatively small amount of light generated in the display element 70. As described above, the dye-sensitized solar cell 300 absorbs some light generated in the display element 70 such that the power consumption of the display element 70 is increased, however the deterioration of image quality and visibility of the image formed by the display element 70 may be minimized.

Next, referring to FIG. 2, the structure of the driving circuit unit (DC) and the display element 70 formed on the substrate main body 110 will be described.

The substrate main body 110 is formed with a transparent insulating substrate made of glass, quartz, ceramic, or plastic. When the substrate main body 110 is made of plastic, the substrate main body 110 may be made of a flexible substrate.

The driving circuit unit (DC) includes a thin film transistor 10 for driving the display element 70.

The thin film transistor 10 includes a semiconductor layer 130, a gate electrode 155, a source electrode 176, and a drain electrode 177.

In an exemplary embodiment, the semiconductor layer 130 is formed of a polysilicon layer. However, the semiconductor layer is not limited thereto. For example, the semiconductor layer 130 may be formed of an amorphous silicon layer, which is an oxide semiconductor.

The gate electrode 155 is disposed on a portion of the semiconductor layer 130, and a gate insulating layer 140 is disposed between the gate electrode 155 and the semiconductor layer 130. The gate electrode 155 may be made of various conducting materials known to persons skilled in the art. The gate insulating layer 140 may include at least one of tetraethyl orthosilicate (TEOS), silicon nitride ($SiN_x$), or silicon oxide ($SiO_2$). For example, the gate insulating layer 140 may have a double-layered structure in which a silicon nitride layer having a thickness of 40 nm and a TEOS layer having a thickness of 80 nm are sequentially layered. However, the gate insulating layer 140 is not limited thereto.

The source electrode 176 and the drain electrode 177 respectively contact the semiconductor layer 130. The source electrode 176 and the drain electrode 177 may be made of various conducting materials known to persons skilled in the art. The source electrode 176 and the drain electrode 177 are distanced from each other and insulated from the gate electrode 155. An interlayer insulating layer 160 may be disposed between the source electrode 176 and the drain electrode 177. The interlayer insulating layer 160 may be made of various insulating materials known to persons skilled in the art. A planarization layer 180 is formed on the source electrode 176, the drain electrode 177 and the interlayer insulating layer 160, and the organic light emitting element 70 is disposed on the planarization layer 180.

The organic light emitting element 70 includes a pixel electrode 710 connected to the drain electrode 177 of the thin film transistor 10, an organic emission layer 720 formed on the pixel electrode 710, and a common electrode 730 formed on the organic emission layer 720. The organic light emitting element 70 may further include a pixel defining layer 190 having an opening that partially exposes the pixel electrode 710 and defines a light emission area. The organic emission layer 720 may emit light in the opening of the pixel defining layer 190.

In an exemplary embodiment, the structures of the thin film transistor 10 and the organic light emitting element 70 are not limited to the structures shown in FIG. 2. As would be understood by those of ordinary skill in the art, the thin film transistor 10 and the organic light emitting element 70 may have various structures within the scope of this disclosure.

Also, the display device 101 further includes a barrier layer 120 disposed between the thin film transistor 10 and the substrate 110. The barrier layer 120 prevents the penetration of impurities or unnecessary components (such as moisture), and planarizes the surface. However, the barrier layer 120 may be omitted depending on the type of substrate 110 and its processing conditions.

Next, referring to FIG. 3, the dye-sensitized solar cell 300 according to an exemplary embodiment will be described.

As shown in FIG. 3, the dye-sensitized solar cell 300 includes a transparent conductive layer 310, a nanoparticle oxide electrode 320, a photo-sensitized dye 330, an opposite electrode 350, an electrolyte solution 340, and a battery sealing member 390.

Also, the dye-sensitized solar cell 300 may further include an additional transparent conductive layer 315 adjacent the opposite electrode 350.

Further, the dye-sensitized solar cell 300 may further include at least one base film 380 that supports and protects at least one of the transparent conductive layer 310 or the opposite electrode 350.

The transparent conductive layer 310 and the additional transparent conductive layer 315 may include at least one transparent conducting material, such as ITO (indium tin oxide), IZO (indium zinc oxide), ZITO (zinc indium tin oxide), GITO (gallium indium tin oxide), $In_2O_3$ (indium oxide), ZnO (zinc oxide), GIZO (gallium indium zinc oxide), GZO (gallium zinc oxide), FTO (fluorine tin oxide), and AZO (aluminum-doped zinc oxide).

The nanoparticle oxide electrode 320 is disposed near the transparent conductive layer 310 and electrically contacts the transparent conductive layer 310. For example, the nanoparticle oxide electrode 320 may be made of titanium oxide ($TiO_2$).

The photo-sensitized dye 330 is adhered to the nanoparticle oxide electrode 320. The photo-sensitized dye 330 includes a material having a photoelectric effect such as cadmium sulfide (CdS). Also, the photo-sensitized dye 330 according to an exemplary embodiment includes a selective photo-absorption material.

The selective photo-absorption material selectively absorbs light from each wavelength band. Also, the selective photo-absorption material may absorb light of a predetermined wavelength band according to the kind of selective photo-absorption material.

In detail, the dye-sensitized solar cell 300 according to an exemplary embodiment absorbs a relatively large amount of light in the wavelength bands of 320 nm to 380 nm, 440 nm to 540 nm, and 630 nm to 900 nm. This is similar to the wavelength bands of light that are not generated in the display element. Accordingly, the photo-sensitized dye 330 includes a selective photo-absorption material capable of absorbing light from the above-described wavelength bands.

The selective photo-absorption material according to an exemplary embodiment includes a compound represented by at least one of Chemical Formula 1 through Chemical Formula 12, below.

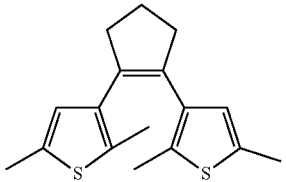

Chemical Formula 1

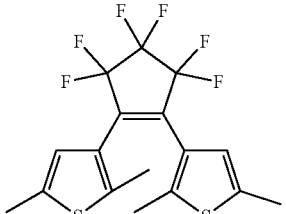

Chemical Formula 2

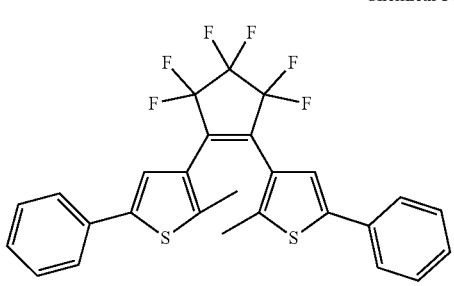

Chemical Formula 3

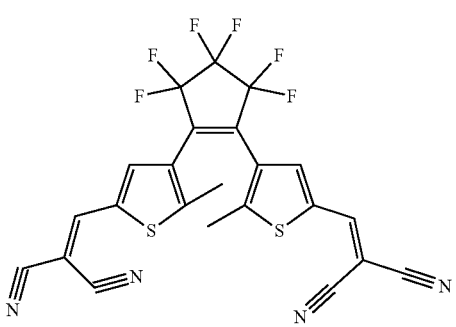

Chemical Formula 4

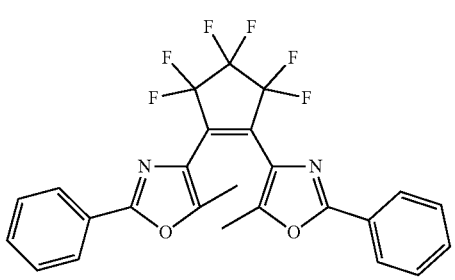

Chemical Formula 5

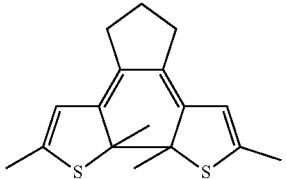

Chemical Formula 6

Chemical Formula 7

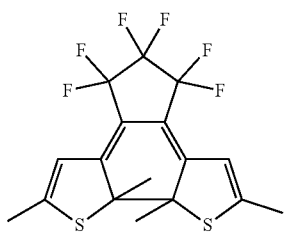

Chemical Formula 8

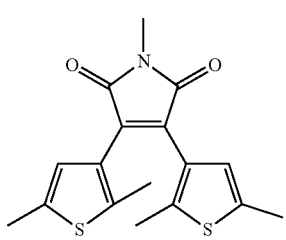

Chemical Formula 9

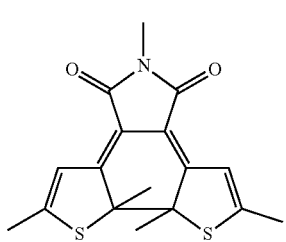

Chemical Formula 10

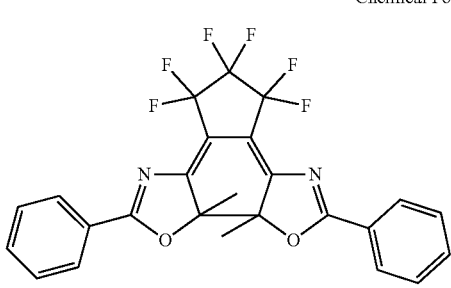

Chemical Formula 11

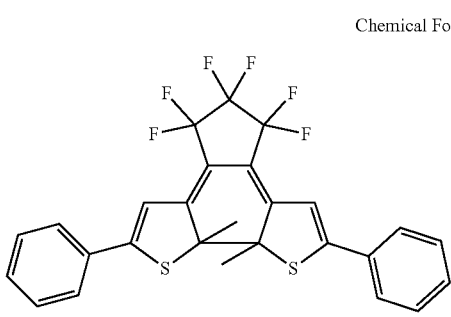

Chemical Formula 12

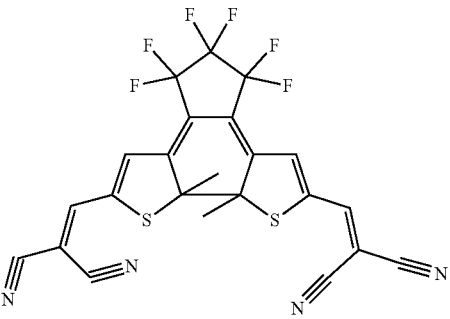

Here, the selective photo-absorption material including at least one of the compounds represented by Chemical Formula 1 through Chemical Formula 5 absorbs a relatively large amount of light from the wavelength band of 320 nm to 380 nm. The selective photo-absorption material including at least one of the compounds represented by Chemical Formula 6 through Chemical Formula 10 absorbs a relatively large amount of light from the wavelength band of 440 nm to 540 nm. Also, the selective photo-absorption material including at least one of the compounds represented by Chemical Formula 11 through Chemical Formula 12 absorbs a relatively large amount of light from the wavelength band of 630 nm to 900 nm.

Figure 4:
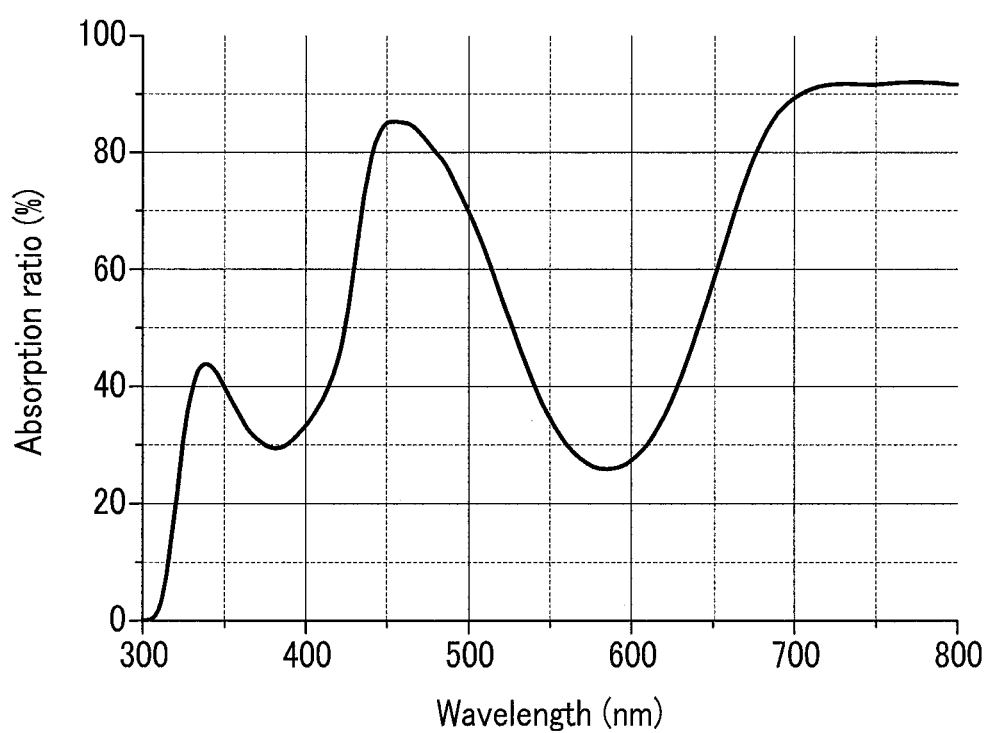
FIG. 4 is a graph of the absorption ratio for each wavelength band of light absorbed by the dye-sensitized solar cell of FIG. 1.

FIG. 4 is a graph of the absorption ratio for each wavelength band of light absorbed by the dye-sensitized solar cell 300 according to an exemplary embodiment. The photo-sensitized dye 330 of the dye-sensitized solar cell 300 includes the above-described selective photo-absorption material such that the distribution of the absorption ratio of the wavelength band substantially corresponds to the graph in FIG. 4.

The opposite electrode 350 is arranged opposite to the transparent conductive layer 310 such that the nanoparticle oxide electrode 320 adhered to the photo-sensitized dye 330 and the electrolyte solution 340 is disposed between the opposite electrode and the transparent conductive layer. That is, the electrolyte solution 340 is filled in the space between the opposite electrode 350 and the transparent conductive layer 310.

For example, the electrolyte solution 340 may include iodide ions. If the iodide included in the electrolyte solution 340 loses an electron, it oxidizes into iodine, and if the iodine again obtains the electron, it reduces back to iodide. As described above, the electrolyte solution 340 may repeat the oxidation/reduction processes.

Also, as the opposite electrode 350, a platinum metal catalyst electrode may be used. However, this disclosure is not limited thereto. The opposite electrode 350 may be formed using various materials known to those skilled in the art.

The battery sealing member 390 seals the space between the transparent conductive layer 310 and the opposite electrode 350. That is, the battery sealing member 390 may permit the electrolyte solution 340 to be stably disposed between the transparent conductive layer 310 and the opposite electrode 350.

When the dye-sensitized solar cell 300 is disposed outside the sealed space, like the rear surface of the substrate main body 110, the base film 380 functions to protect and support the constituents of the dye-sensitized solar cell 300. That is, the base film 380 may be appropriately positioned according to where the dye-sensitized solar cell 300 is disposed.

Next, the effect of using the dye-sensitized solar cell 300 with the display device 101 according to an exemplary embodiment will be described.

When the photo-sensitized dye 330 absorbs light such that it is excited, the excited electrons are transmitted to the nanoparticle oxide electrode 320, thereby generating electricity. At this time, due to the selective photo-absorption material included in the photo-sensitized dye 330, the photo-sensitized dye 330 absorbs light from a it corresponding wavelength band. Also, the light that is not absorbed by the photo-sensitized dye 330 is transmitted through the dye-sensitized solar cell 300. According to an exemplary embodiment, most of the light generated in the display element 70 is transmitted through the dye-sensitized solar cell 300 such that the reduction in efficiency of the display element 70 may be minimized.

In detail, if external light (such as sunlight) passes through the transparent conductive layer 310 of the dye-sensitized solar cell 300 and is irradiated to the photo-sensitized dye 330 adhered to the nanoparticle oxide electrode 320, the photo-sensitized dye 330 absorbs light from its corresponding wavelength band. At this time, the electrons of the photo-sensitized dye 330 are photo-excited from the ground state to an excited state. The excited electrons jump into a conduction band of the nanoparticle oxide electrode 320 and are diffused through the nanoparticle oxide electrode 320, and then arrive at the transparent conductive layer 310. The electrons received by the transparent conductive layer 310 are supplied to the display element 70. Meanwhile, the photo-sensitized dye 330 that loses the electrons is reduced by obtaining electrons from the electrolyte solution 340, and the electrolyte solution 340 is oxidized. Also, the electrolyte solution 340 obtains electrons from the opposite electrode 350, thereby again being reduced. When the oxidation/reduction processes are repeated, the dye-sensitized solar cell 300 according to an exemplary embodiment generates electricity. Also, the generated electricity is supplied to the display element 70, thereby being used as an assistant power source.

The display device 101 according to an exemplary embodiment may improve power usage efficiency through the use of a dye-sensitized solar cell 300 that selectively absorbs light.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
a display element for displaying an image; and
a dye-sensitized solar cell for converting light into electricity and offset power consumption of the display element, wherein the dye-sensitized solar cell includes a selective photo-absorption material for selectively absorbing light from at least one wavelength band,
wherein the dye-sensitized solar cell comprises: a transparent conductive layer; a nanoparticle oxide electrode contacting the transparent conductive layer; a photo-sensitized dye adhered to the nanoparticle oxide electrode; an opposite electrode opposite the transparent conductive layer such that the nanoparticle oxide electrode is between the opposite electrode and the transparent conductive layer; and
an electrolyte solution between the transparent conductive layer and the opposite electrode,
wherein the photo-sensitized dye comprises the selective photo-absorption material.

2. The display device of claim 1, wherein the display element is an organic light emitting element.

3. The display device of claim 2, wherein the dye-sensitized solar cell absorbs more light from wavelength bands within the visible ray region and the near infrared ray region other than from a wavelength band of light generated in the display element.

4. The display device of claim 1, wherein the dye-sensitized solar cell is disposed in at least one of a front direction or a rear direction of the display element.

5. The display device of claim 1, wherein the opposite electrode comprises a platinum metal catalyst electrode.

6. The display device of claim 1, wherein the nanoparticle oxide electrode comprises titanium oxide ($TiO_2$).

7. The display device of claim 1, wherein the photo-sensitized dye comprises cadmium sulfide (CdS).

8. The display device of claim 1, wherein the dye-sensitized solar cell further comprises a battery sealing member for sealing a space between the transparent conductive layer and the opposite electrode.

9. The display device of claim 1, wherein at least one of the transparent conductive layer and the opposite electrode is supported by a base film.

10. The display device of claim 1, wherein the selective photo-absorption material comprises at least one compound selected from the group consisting of compounds represented by Chemical Formula 1 through Chemical Formula 12:

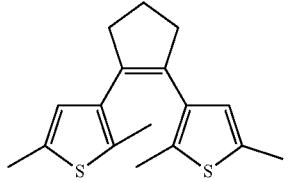

Chemical Formula 1

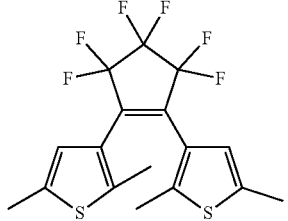

Chemical Formula 2

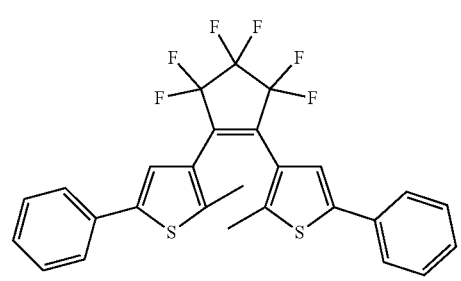

Chemical Formula 3

Chemical Formula 4

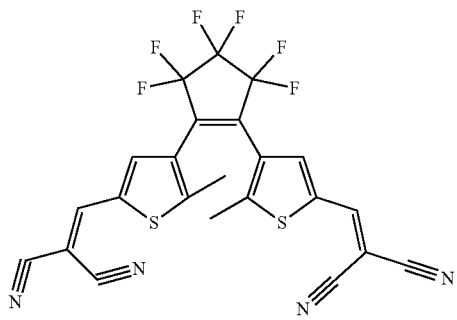

Chemical Formula 5

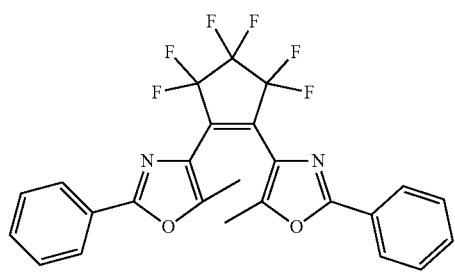

Chemical Formula 6

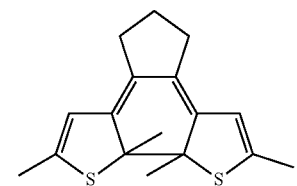

Chemical Formula 7

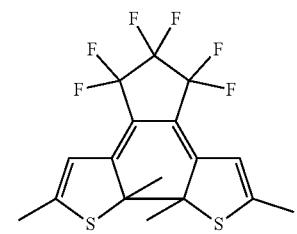

Chemical Formula 8

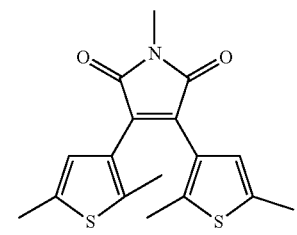

Chemical Formula 9

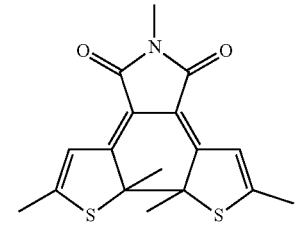

Chemical Formula 10

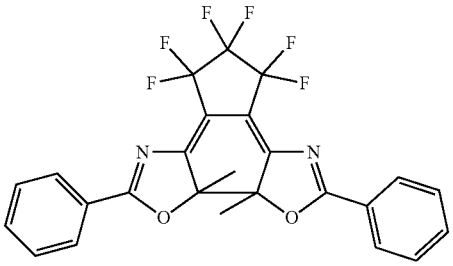

Chemical Formula 11

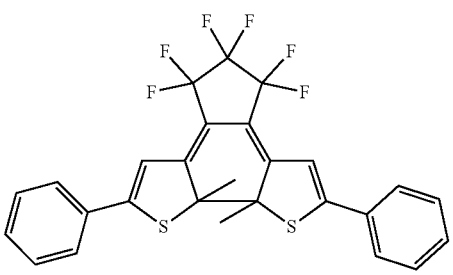

Chemical Formula 12

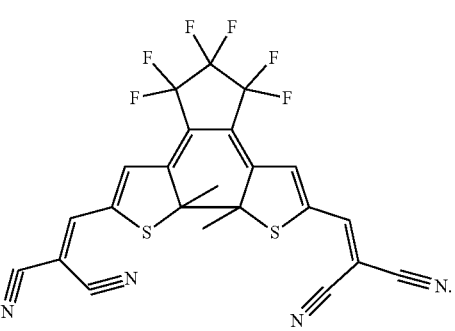

11. The display device of claim 10, wherein the dye-sensitized solar cell absorbs more light from wavelength bands of 320 nm to 380 nm, 440 nm to 540 nm, and 630 nm to 900 nm than light from other wavelength bands.

12. The display device of claim 10, wherein the selective photo-absorption material comprises at least one compound selected from the group consisting of compounds represented by Chemical Formula 1 through Chemical Formula 5, and the selective photo-absorption material absorbs more light from a wavelength band of 320 nm to 380 nm than light from other wavelength bands.

13. The display device of claim 10, wherein the selective photo-absorption material comprises at least one compound selected from the group consisting of compounds represented by Chemical Formula 6 through Chemical Formula 10, and the selective photo-absorption material absorbs more light from a wavelength band of 440 nm to 540 nm than light from other wavelength bands.

14. The display device of claim 10, wherein the selective photo-absorption material comprises at least one compound selected from the group consisting of compounds represented by Chemical Formula 11 and Chemical Formula 12, and the selective photo-absorption material absorbs more light from a wavelength band of 630 nm to 900 nm than light from other wavelength bands.

* * * * *